3,346,509
CO-PRECIPITATED SILICA-ALUMINA CATALYST
PROCESS AND COMPOSITION
Meredith M. Stewart, Penn Hills Township, Allegheny County, Pa., assignor to Gulf Research & Development Company, Pittsburgh, Pa., a corporation of Delaware
No Drawing. Filed June 12, 1964, Ser. No. 374,810
4 Claims. (Cl. 252—453)

This invention relates to a process for making silica-alumina compositions. More particularly, this invention relates to a process for making microporous silica-alumina gels of high surface area, having a high proportion of pore volume in pores of small radius, and an extremely low content of alkali-metal contaminants. The compositions produced by the process of this invention are particularly useful as cracking catalysts.

Silica-alumina gels have been made by mixing a dilute aqueous solution of sodium silicate, commonly called water glass, with sulfuric acid to form a mixture of silica sol and sodium sulfate and adding to this mixture a solution of aluminum sulfate. Aqueous ammonia is then added to bring about formation of a silica-alumina gel.

Alkali metals, even in small proportions in the neighborhood of a few hundredths of a percent or so, have a deleterious effect upon the cracking activity of silica-alumina catalysts. Hence, it has been necessary to wash gels, such as that described above, to remove from them the sodium or other alkali metal ions incorporated in these gels during their preparation. Although by such washing the alkali metal content of silica-alumina gels has been substantially reduced, it has not been possible to reduce the alkali metal content of commercial silica-alumina cracking catalysts to the extent that the deleterious effect of these alkali metals has been completely overcome. For example, a commercial silica-alumina containing 25 percent alumina and produced by the above-described procedure was found to be contaminated with about 0.05 percent sodium. Removal of alkali metal content by washing becomes increasingly difficult as the alumina content of the gels increases above 25 percent.

Prior artisans, recognizing the difficulty of washing alkali metal contaminants from silica-alumina gel compositions, have tried to make silica-alumina compositions of low alkali metal content and high hydrocarbon cracking activity by using as starting material silica sols of low alkali-metal content. For example, it has been proposed to mix a silica sol prepared by metathesis in a bed of an ion-exchange resin with alumina hydrosols. Unfortunately, although the alkali metal content of the silica-alumina gels made by this procedure is low, their catalytic cracking activity has turned out to be poor, owing, it is believed, to a less advantageous pore structure in which the perponderance of the pore volume lies in pores of large radius—for example, in pores with radii greater than 50 angstroms. This results, it is believed, from a heterogeneity of the gel structure. Although the cause of the suspected heterogeneity is not known, it may result from the difficulty of homogenizing two components, both of which have colloidal, as opposed to solute, nature.

It has also been proposed to prepare silica-alumina compositions by impregnating a silica hydrosol with a salt of an alkaline earth metal, bringing about gelation of the impregnated hydrosol, as by allowing the sol to stand, and treating the resulting gel with an aluminum salt. Such gels, while possessing some cracking activity, are nevertheless not fully active for this purpose and, in fact, are considered less satisfactory than the gels prepared with alumina hydrosols. This lack of full activity may be due to the neutralization by residual alkaline earth metal ions of some of the acid sites of the silica-alumina composition.

By the present invention, a method is provided for making silica-alumina compositions substantially free of alkali metal and alkaline earth metal contaminants and at the same time having high cracking activity and a pore structure with a preponderance of the pore volume in pores of small radii—for example, radii less than 50 angstroms, preferably less than 30 angstroms. The compositions prepared by the method of this invention contain in general less than 0.01 percent alkali metals. In accordance with this invention, a dilute silica sol, substantially free of cationic contaminants, is mixed with an aqueous solution of a substance capable of yielding aluminum cations in aqueous solution, for example, a solution of aluminum chloride hexahydrates. Gelation of the resultant mixture is then brought about as by addition to the mixture of aqueous ammonia. Desirably, the gel is washed to remove the anion whose source was the solution containing the aluminum cation. To ready the gel for catalytic use it may be dried and calcined, or for other catalytic uses, it may be impregnated with salts of catalytically active metals before drying and calcination.

In accordance with the present invention, a number of methods are available for preparing the cation-free, dilute silica sol. Preferably, a dilute solution of sodium silicate is flowed, as by percolation or pumping, through a bed of protonated cation-exchange material to recover an effluent dilute silica sol substantially free of cationic contaminants. Any soluble silicate can be used in this method. I prefer, however, sodium silicate solutions going commonly under the name of "water glass" because the solutions are cheap and easily available.

Because the silica sol used as a starting material in accordance with this invention must be dilute, the silica sol containing less than the equivalent of 5 percent silica, preferably between 1 and 3 percent silica, I prefer to employ for its preparation a dilute solution of soluble silicate—that is, one containing no more than the equivalent of about 5 percent, and preferably between 1 and 3 percent silica. Solutions more dilute than those containing the equivalent of 1 percent silica are satisfactory but entail handling more liquid for a given amount of my silica-alumina product.

Any solid cation-exchange material insoluble in water may be employed in this embodiment of the method of my invention. Cation-exchanging resins of high cation-exchange capacity, such, as for example, as sulfonated phenol formaldehyde resins or divinylbenzene cross-linked sulfonated polystyrene resin, like Amberlite IR–120 (manufactured by Rohm and Haas) have given excellent results in the production of dilute silica sols. Other cation-exchange materials can be used, such as sulfuric acid-treated coal or wood. In every instance the ion-exchange material must be in acid form. It may be placed in this form by washing with a suitable strong acid, such as sulfuric acid or hydrochloric acid; the residual acid adhering to the granules of the ion-exchange material or remaining within the interstices in the bed of ion-exchange material may be removed by washing with water.

In producing the cation-free silica sol, a single bed of cation-exchange material may be employed or a plurality of beds arranged in series or in parallel or both. When beds are employed in series, it is advantageous to feed the fresh silicate solution to the most nearly spent bed of cation-exchange material with a substantially cation-free silica sol emanating from the most recently regenerated bed of ion-exchange material. Regeneration is accomplished by acid washing, as described above for the initial preparation of the ion-exchange material. To determine when a bed is spent, it is convenient to measure continuously or from time to time the pH or the conductivity of the effluent silica sol. The pH of a satisfactory sol is in the neighborhood of 3, and its specific conductance is in the neighborhood of $10^{-4}$–$10^{-5}$ ohm$^{-1}$cm.$^{-1}$. When the pH rises to about 5, the processing must be interrupted for regeneration and advantageously permutation of beds of ion-exchange material.

It is also within the purview of this invention to employ dilute silica sol made by other methods substantially free of cationic contaminants. For example, satisfactory dilute cation-free silica sol may be made by hydrolysis of ethylorthosilicate or of silicon tetrachloride.

According to the method of this invention, the dilute silica sols substantially free of cationic contaminants must be mixed promptly with an aqueous solution of a substance that yields aluminum cations; that is, the silica sols must be freshly prepared.

For the practice of the instant invention, an aqueous solution of any substance which yields aluminum cations in aqueous solution can be used, for example, aqueous solutions of aluminum chloride hexahydrate, aluminum nitrate, or aluminum sulfate. We have employed with excellent results aqueous solutions of aluminum chloride hexahydrate, which is plentiful and cheap. Aqueous solutions of substances which yield anionic aluminum in aqueous solution, sodium aluminate solutions for example, are unsuitable for the practice of the instant invention.

Mixing of the substantially cation-free silica sol with the aqueous solution containing aluminum cations should be sufficiently thorough to produce a completely homogeneous liquid. Because cation-free, dilute silica sols are unstable, having a tendency to gel, it is essential, as indicated above, that the silica sol be used soon after its preparation, for example, within 12 hours after its preparation, preferably within one hour after its preparation. Indeed, when the silica sol is prepared by flowing a soluble silicate through an ion-exchange resin bed, an excellent practice in accordance with the instant invention is to flow the silica sol directly from the bed of ion-exchanging resin into an aqueous solution of a substance which yields aluminum cations. Before gelation of silica sol, a subtle change takes place in the sol, akin, perhaps, to a polymerization. In the practice of the instant invention, the silica sol freshly prepared is mixed with an aqueous solution of a substance which yields aluminum cations before such subtle change has advanced, that is, immediately or shortly after preparation of the ion-free silica sol.

Silica sols available on the market and characterized as "stabilized" are unsuitable and unsatisfactory for the practice of the instant invention. Use of such silica sols as starting materials results in silica-alumina compositions of inferior catalytic cracking activity and having a small proportion of pore volume in pores of small radius. These silica sols are not substantially free of cationic contaminants.

In selecting the aluminum compound to employ in aqueous solution in the practice of the instant invention, it is important to distinguish substances which yield aluminum cations in aqueous solution from substances which yield aluminum oxides or hydrated aluminum oxides. The latter, dispersed as alumina hydrosols, are unsatisfactory starting materials for the process of the instant invention. Such hydrosols, if employed, lead to silica-alumina compositions of inferior cracking activity and distribution of pore volume in pores of larger diameter. The alumina hydrosols do not lend appreciable conductivity to the water in which they are dispersed, and they are characterized by a colloidal character rather than by the highly cationic character necessary for the practice of my invention. Reactive organoaluminum compounds, for example, aluminum triethyl, when mixed with water produce hydrous aluminum oxides and are unsuitable for the practice of the instant invention.

After thorough homogenization of the mixture of dilute, freshly prepared silica sol and an aqueous solution of a substance yielding aluminum cations, gelation is brought about by increasing the pH of the mixture. This may be done conveniently by addition of aqueous ammonia with stirring or addition of gaseous ammonia, as through a sparger. The alkaline agent chosen for raising the pH of the mixture of silica sol and the solution containing aluminum cations should be such as to leave no harmful residue in the resulting silica-alumina composition. For this reason, alkali-metal hydroxide solutions are unsatisfactory, for they leave in the product a residue of alkali metal difficult, if not impossible, to remove by washing. Ammonia, on the other hand, is cheap, easily available, and leaves no residue upon calcination of the resulting gel. Other bases, such a trimethylammonium hydroxide, hydrazine, or quinolinium hydroxide, can be employed, but they are expensive and appear to show no advantage.

The resulting gel is separated, as by filtration or centrifugation, and washed, and can be dried and calcined.

To ready the silica-alumina gels of the instant invention for use as cracking catalysts, they are dried, as, for example, in an oven overnight at 240° F. and calcined, as, for example, at 900°–1100° F. for eight hours.

The following examples are intended to illustrate the method of the instant invention and to show the utility of the product of the method, but are not to be construed in any way as limiting the scope of the instant invention, which is defined only by the claims appended hereto.

*Example 1*

Into a column about 4 inches inside diameter was placed a bed of 500 grams of Amberlite IR–120 resin, a sulfonated polystyrene cross-linked with divinylbenzene and manufactured by Rohm and Haas Company. This resin was then converted to acid form by flowing 3.5 liters of 10 percent hydrochloric acid through the bed. The bed was rinsed with water to remove excess acid from it.

Philadelphia Quartz "N" brand sodium silicate (313.5 grams; 28.7 percent $SiO_2$) was mixed with 3 liters of water, and the mixture was flowed through the bed of ion-exchange resin treated as described in the preceding paragraph. The sodium ion was retained on the bed and the liquid issuing from the column was a substantially sodium-free silica sol. To remove residual silica sol from the column, one liter of water was flowed through it.

Aluminum chloride hexahydrate (47.3 grams) was dissolved in one liter of water. This solution was then mixed with the silica sol whose preparation was described in the preceding paragraph. To the resultant mixture was added 150 milliliters of dilute aqueous ammonia (8 percent $NH_3$) with constant stirring to obtain a pH of 8.1. This resulted in a slurry of silica-alumina hydrogel. The slurry was filtered and the cake washed with water to which had been added 5 milliliters of concentrated aqueous ammonia per liter. The washing was continued until the conductivity of the wash water had fallen to a constant level.

The filter cake was dried at 250° F. for 16 hours and then calcined at 900° F. for 16 hours. The resulting material had a composition corresponding to 90 percent silica and 10 percent alumina, and contained less than 0.01 percent sodium.

*Example 2*

Into a column of about 4 inches inside diameter was placed a bed of 2500 grams of Amberlite IR–120 resin. This was converted to the acid form, as described in Example 1, by flowing 10 percent hydrochloric acid through the column and rinsing away excess acid by flowing water through the column.

Philadelphia Quartz "N" sodium silicate (1940 grams; 27 percent $SiO_2$) was mixed with 20 liters of water. The mixture was flowed through a bed of ion-exchange resin prepared as described above. The effluent was a silica sol essentially free of sodium. Residual silica sol was rinsed from the bed by flowing through it 2 liters of water.

Aluminum chloride hexahydrate (946 grams) was dissolved in 4 liters of water. This solution was mixed with the silica sol prepared as described in the preceding paragraph. To the resultant mixture was added 2 liters of dilute aqueous ammonia (8 percent $NH_3$) as a slow stream with constant stirring of the mixture. This resulted in increasing the pH to 8 and causing a silica-alumina gel to form as a slurry. The slurry was filtered and the filter cake was washed with water to which had been added 5 milliliters of concentrated aqueous ammonia per liter. Washing was continued until the conductivity of the wash water fell to a constant value.

The filter cake was oven-dried at 250° F. for 16 hours and then calcined at 900° F. for 16 hours. The resulting material had a composition corresponding to 50 percent silica and 50 percent alumina, and contained less than 0.01 percent sodium.

*Example 3*

A bed of 1000 grams of Amberlite IR–120 ion-exchange resin was treated with dilute hydrochloric acid to convert the resin to acid form. The bed was rinsed with water to remove excess acid.

Philadelphia Quartz "N" brand sodium silicate (557 grams; 28.7 percent $SiO_2$) was mixed with 5 liters of water, and the mixture was flowed through the bed of acidified ion-exchange resin to produce a substantially cation-free silica sol. The bed was rinsed with one liter of water, and the rinse water was added to the dilute silica sol.

In 2 liters of water were dissolved 195.9 grams of $Al_2(SO_4) \cdot 18H_2O$. The resulting solution was thoroughly mixed with the silica sol produced as described above. To the mixture was added 290 ml. of dilute aqueous ammonia (8 percent $NH_3$) with constant stirring. The pH rose to 7.2. This resulted in formation of a gel. The gel was washed with water containing 5 ml. of concentrated aqueous ammonia (28 percent $NH_3$) per liter until the conductivity of the wash water leveled out. The washed gel was dried for 16 hours at 250° F. and calcined for 16 hours at 900° F. The gel had a composition corresponding to 85 percent silica and 15 percent alumina, and contained less than 0.01 percent sodium.

*Example 4*

A bed of 3000 grams of Amberlite IR–120 resin was treated with 6 liters of dilute hydrochloric acid to convert the resin to acid form. The bed was rinsed with distilled water to remove excess acid.

Philadelphia Quartz "N" brand sodium silicate (1220 grams; 28.7 percent $SiO_2$) was mixed with about 12 liters of water, and the mixture was passed through the bed of ion-exchange resin to produce a substantially cation-free silica sol.

In 5 liters of water were dissolved 710 grams of aluminum chloride hexahydrate. The resulting solution was mixed with the silica sol produced as described above. The mixture was gelled by adding dilute aqueous ammonia (8 percent $NH_3$) in a slow stream with constant mixing until the pH had risen to 8.0. This required 1700 ml. of dilute ammonia. The resulting gel was filtered, and the filter cake was washed with water containing 5 ml. concentrated aqueous ammonia (28 percent $NH_3$) per liter until the conductivity of the wash water fell to a constant value. The gel was then dried at 250° F. for 16 hours and calcined at 900° F. for 16 hours. The resulting material had a composition corresponding to 70 percent silica and 30 percent alumina, and contained less than 0.01 percent sodium.

To show the deleterious effect of employing alumina sol in the preparation of silica-alumina compositions, a silica-alumina was prepared as follows:

Cation-free silica sol was prepared by flowing a mixture of 2439 grams of water glass (28.7 percent $SiO_2$) and 25 liters of water through a column of 3000 grams of Amberlite IR–120 ion-exchange resin protonated as described in Example 4. The column was rinsed with 3 liters of water, and the rinse water was added to the silica sol.

Aluminum isopropylate (1200 grams) was mixed with 2000 grams of isopropyl alcohol, and the resulting mixture was added to a mixture of 500 grams of glacial acetic acid and 2 liters of water. The constituents were mixed until a uniform alumina hydrosol was obtained. This was then added to the silica sol made as described above, and 2800 ml. of aqueous ammonia (8 percent $NH_3$) was added to bring the pH to 8 and to bring about gelation. The gel was filtered, the filter cake was sucked dry, oven-dried at 250° F. and calcined for 16 hours at 900° F.

The surface areas and pore volume distributions of the calcined materials of Examples 1, 2, 3 and 4 of the silica-alumina composition whose preparation is described above, and of a commercial cracking catalyst, were determined by nitrogen adsorption measurements. These physical properties and the average pore radii and specific pore volume are listed in Table I.

TABLE I.—NITROGEN ADSORPTION MEASUREMENTS ON SILICA-ALUMINA SUPPORTS

| Example Number | Composition, percent by wt. | Pore Radius, avg. A. | Pore Vol., ml./g. | B.E.T., m.²/g. | Percent Pore Volume in Pores Having Radii (in A.) Between— | | | | | | | |
|---|---|---|---|---|---|---|---|---|---|---|---|---|
| | | | | | +200 | 100/200 | 50/100 | 40/50 | 30/40 | 20/30 | 10/20 | −10 |
| 1 | 90 SiO₂–10 Al₂O₃ | 15 | 0.35 | 487 | 0.2 | 0.8 | 2.7 | 1.8 | 6.0 | 18.7 | 59.1 | 10.8 |
| 2 | 50 SiO₂–50 Al₂O₃ | 48 | 0.85 | 414 | 7.0 | 15.0 | 26.2 | 11.4 | 14.4 | 18.1 | 7.9 | 0.0 |
| 3 | 85 SiO₂–15 Al₂O₃ | 17 | 0.40 | 491 | 1.4 | 2.8 | 1.1 | 2.3 | 5.8 | 23.6 | 60.8 | 2.3 |
| (¹) | 75 SiO₂–25 Al₂O₃ | 36 | 0.83 | 474 | 1.2 | 2.3 | 17.7 | 18.9 | 25.5 | 25.5 | 8.8 | 0.0 |
| (²) | 70 SiO₂–30 Al₂O₃ | 36 | 0.56 | 310 | 19.5 | 31.6 | 15.3 | 1.8 | 3.4 | 7.6 | 20.8 | 0.0 |
| 4 | 70 SiO₂–30 Al₂O₃ | 18 | 0.39 | 456 | 2.1 | 2.6 | 2.3 | 2.0 | 5.5 | 4.8 | 61.0 | 0.0 |

¹ Commercial cracking catalyst.  ² Produced from silica sol and alumina sol.

It is apparent from the pore volume distribution listed in Table I that the silica-alumina gels produced in accordance with the method of this invention have a high proportion of pore volume in small pores. Moreover, they have a greater proportion of pore volume per gram in small pores than does a typical commercial cracking catalyst of comparable chemical composition or a silica-alumina composition made by gelling a mixture of silica and alumina sols. The pore volume distribution is a function not only of the method of preparation of silica-alumina gels, but also of their chemical composition, that is, the ratio of silica to alumina. Thus, to isolate the effect of the method of preparation on pore volume distribution, silica-alumina gels of the same or nearly the same chemical composition should be compared. The silica-alumina gels produced by the method of this invention also have small average pore radii, high specific surface area, and high pore volume per gram.

The surface acidity of the silica-alumina gels of Examples 1 and 3, as well as that of the commercial silica-alumina cracking catalyst, and of the silica-alumina composition made by gelling a mixture of silica and alumina sols, were determined by ammonia adsoprtion and desorption, as described by R. T. Barth and E. V. Ballou in Analytical Chemistry 33, pp. 1080–1084 (1961). The surface acidities so determined, as well as the sodium content of the respective catalysts, are listed in Table II.

A commercial cracking catalyst containing about 75 percent silica and 25 percent alumina and about 0.05 percent sodium was subjected to the same bench-scale cracking activity evaluation test under the same conditions as that described in Example 5 above.

TABLE II.—SURFACE ACIDITY AND SODIUM CONTENT OF SILICA-ALUMINA CATALYSTS BY AMMONIA ADSORPTION

| Example Number | Composition, Percent by wt. | Milliequivalents of Ammonia per Gram of Sample Temp., °F. | | | | | | Sodium Content, percent |
|---|---|---|---|---|---|---|---|---|
| | | 400 | 500 | 600 | 700 | 800 | 900 | |
| 1 | 90 SiO₂–10 Al₂O₃ | 0.56 | 0.45 | 0.30 | 0.25 | 0.24 | 0.21 | <0.01 |
| (¹) | 75 SiO₂–25 Al₂O₃ | 0.51 | 0.45 | 0.41 | 0.35 | 0.31 | 0.26 | 0.09 |
| 3 | 85 SiO₂–15 Al₂O₃ | 0.46 | 0.37 | 0.29 | 0.22 | 0.17 | 9.12 | <0.01 |
| 4 | 70 SiO₂–30 Al₂O₃ | 0.50 | 0.45 | 0.39 | 0.34 | 0.27 | 0.22 | <0.01 |
| (²) | 70 SiO₂–30 Al₂O₃ | 0.20 | 0.20 | 0.19 | 0.17 | 0.12 | 0.07 | |

¹ Commercial cracking catalyst. ² Produced from silica sol and alumina sol.

From the acidities listed, it is apparent that the silica-alumina gels prepared in accordance with the method of the instant invention have high acidity. Such surface acidity has been correlated with cracking activity and with catalytic activity for bringing about other reactions which proceed by a carbonium ion mechanism, for example, alkylation and hydration; thus, the higher the acidity, the higher the catalytic activity. It is apparent from the data listed in Table II in the light of the correlation of surface acidity with cracking activity that the compositions of the instant invention have catalytic cracking activity superior to that of a silica-alumina of the same chemical composition but made by gelling a mixture of silica and alumina sols. While the surface acidity of the commercial cracking catalyst was found to be comparable to that of a silica-alumina having substantially the same silica and alumina content, it will be noted that the silica-alumina composition of this invention each had a lower sodium content. The relatively lower sodium content of the silica-aluminas of the present invention is important from the standpoint of cracking activity, as pointed out above and as also demonstrated by experimental data presented hereinbelow. Low sodium content is also considered important from the standpoint of selectivity of products.

Example 5

The silica-alumina gel of Example 2, which contained less than 0.01 percent sodium, was tested for cracking activity in a small bench-scale reactor in a modification of the Indiana Downflow Test, as described by A. C. Whitaker and A. D. Kinzer in Industrial & Engineering Chemistry 47, pp. 2153–2157 (1955). The oil charged to the test reactor was a Mid-Continent 35° API gas oil. The test ran for 20 minutes during which time the catalyst bed temperature averaged 920° F. The space velocity employed was 2.0 grams of oil charged per gram of catalyst per hour, and the catalyst-oil ratio on a weight basis was 1.5. The yields of cracked material are listed in Table III.

Example 6

The catalyst of Example 3, which contained less than 0.01 percent sodium, was subjected to a bench-scale cracking evaluation test under the same conditions as recited in Example 5 above.

The yields of cracked material produced in the tests of Examples 5 and 6, and for the commercial catalyst are listed in Table III.

TABLE III.—DOWNFLOW ACTIVITY TESTING OF SILICA-ALUMINA CRACKING CATALYSTS

| Example Number | 6 | 5 | Commercial Cracking Catalyst |
|---|---|---|---|
| Catalyst Composition (Calculated): | | | |
| Silica, wt. percent | 85 | 50 | 75.0 |
| Alumina, wt. percent | 15 | 50 | 25.0 |
| Downflow Activity Test— | | | |
| Operating Conditions: | | | |
| Temperature, °F | 920 | 920 | 920 |
| Process Time, min | 20 | 20 | 20 |
| Space Velocity, wt./hr./wt | 2.0 | 2.0 | 2.0 |
| Catalyst-to-Oil Ratio, wt./wt | 1.5 | 1.5 | 1.5 |
| Average Pressure, p.s.i.g | 3.1 | 3.8 | 3.8 |
| Yields (Corr. to 100% wt. bal.): | | | |
| Conversion (100-Cycle Oil), wt. percent | 83.1 | 81.3 | 78.7 |
| Gas, wt. percent | 39.07 | 40.40 | 34.1 |
| Coke, wt. percent | 10.08 | 10.49 | 8.8 |
| Gasoline (IBP-410° F.), wt. percent | 33.90 | ¹ 30.40 | 35.9 |
| Gas Gravity (Air=1) | 1.468 | 1.412 | 1.384 |
| Hydrogen, cu. ft./bbl.chg | 82.43 | 121.30 | 115.6 |
| Gasoline/Conversion, wt./wt | 0.403 | ¹ 0.374 | 0.456 |
| Conversion and Coke Yields Corr. to Atmos. Pressure: | | | |
| Conversion, wt. percent | 81.6 | 79.4 | 76.0 |
| Coke, wt. percent | ² 9.5 | ² 9.1 | 7.95 |
| Carbon Factor (C) | ³ 1.12 | ³ 1.17 | 1.14 |

¹ Information only (IBP-325° F.) (normal gasoline cut is IBP-410° F.): Volume of synthetic crude too small for complete distillation.
² Beyond the scope of the method; coke is calculated by assuming the same pressure correction as that obtained at lower coke values.
³ Conversion is higher than the highest conversion obtained with standard catalyst; therefore, carbon factor is based on extrapolation of data for standard catalyst.

It is clear from Table III that the cracking activity as measured by conversion of both the catalysts of Example 5 and of Example 6 was higher than that of the commercial cracking catalyst. As indicated above, the proportion of alumina also has an effect on cracking activity, the catalyst containing 15 percent alumina having somewhat higher activity than that containing 50 percent alumina.

The silica-alumina compositions of the instant invention also have utility as bases or carriers for catalytic components which promote other reactions, for example, isomerization, polymerization, hydrogenation, hydrodesulfurization, and hydrocracking.

I claim:
1. A method for preparing silica-alumina compositions, the method comprising (1) mixing (a) a freshly prepared silica sol substantially free of cationic impurities and having a pH between 1 and 3.5, said silica sol being in an unstable state tending to transform spontaneously into a gel, and containing the equivalent of between 1 and 3 percent by weight of silica and (b) an aqueous solution of a substance which yields aluminum cations in aqueous solution, said mixing being carried out before advancement of polymerization toward formation of a gel and (2) raising the pH of the resultant mixture to cause gelation.

2. The method of claim 1 in which the substance which yields aluminum cations in aqueous solution is aluminum chloride hexahydrate.

3. A microphorous silica-alumina composition having a preponderance of its pore volume in pores of radius less than 30 Angstroms, having a surface acidity at 600° F. of more than 0.25 milliequivalents of ammonia per gram, having an alkali metal content less than 0.01 percent, and having a pore volume less than 0.5 cc. per gram said composition having been prepared in accordance with the method of claim 1.

4. A method for preparing silica-alumina compositions, comprising (1) flowing aqueous sodium silicate containing the equivalent of between 1 and 3 percent by weight silica through a bed of protonated ion-exchange material to form a substantially sodium-free aqueous silica sol having a pH between 1 and 3.5, said silica sol being in an unstable state and tending to transform spontaneously into a gel, (2) mixing with said silica sol an aqueous solution of a substance which yields aluminum cations in aqueous solution, said mixing being carried out substantially immediately after formation of the silica sol and before advancement of polymerization toward formation of a gel, (3) cogelling the resulting mixture, and (4) separating the resulting silica alumina cogel, drying and calcining the same.

References Cited
UNITED STATES PATENTS

| | | | |
|---|---|---|---|
| 2,469,314 | 5/1949 | Ryland et al. | 252—455 |
| 2,565,886 | 8/1951 | Ryland | 252—453 |
| 2,703,314 | 3/1955 | Dirnberger | 210—38 |
| 2,908,635 | 10/1959 | Ogorzaly | 252—453 |

DANIEL E. WYMAN, *Primary Examiner.*

OSCAR R. VERTIZ, *Examiner.*

H. S. MILLER, C. F. DEES, *Assistant Examiner.*

UNITED STATES PATENT OFFICE
CERTIFICATE OF CORRECTION

Patent No. 3,346,509            October 10, 1967

Meredith M. Stewart

It is hereby certified that error appears in the above numbered patent requiring correction and that the said Letters Patent should read as corrected below.

Column 3, line 41, for "ion-exchanging" read -- ion-exchange --; column 5, line 34, for "$Al_2(SO_4)$" read -- $Al_2(SO_4)_3$ --; columns 7 and 8, TABLE II, eighth column, line 3 thereof, for "9.12" read -- 0.12 --; column 9, line 13, for "microphorous" read -- microporous --.

Signed and sealed this 5th day of November 1968.

(SEAL)
Attest:

Edward M. Fletcher, Jr.            EDWARD J. BRENNER
Attesting Officer            Commissioner of Patents